United States Patent
Roscoe et al.

(10) Patent No.: US 12,074,763 B2
(45) Date of Patent: Aug. 27, 2024

(54) DEVICE DESCRIPTOR FILE MANAGEMENT WITH PREDICTIVE CAPABILITY

(71) Applicant: BRITISH TELECOMMUNICATIONS PUBLIC LIMITED COMPANY, London (GB)

(72) Inventors: Jonathan Roscoe, London (GB); Fadi Ali El-Moussa, London (GB)

(73) Assignee: British Telecommunications Public Limited Company (GB)

( * ) Notice: Subject to any disclaimer, the term of this patent is extended or adjusted under 35 U.S.C. 154(b) by 0 days.

(21) Appl. No.: 18/309,935

(22) Filed: May 1, 2023

(65) Prior Publication Data

US 2023/0353452 A1    Nov. 2, 2023

(30) Foreign Application Priority Data

Apr. 29, 2022    (EP) .................................... 22170757

(51) Int. Cl.
*H04L 41/082* (2022.01)
*G06F 8/65* (2018.01)
*H04L 67/00* (2022.01)
*H04L 67/12* (2022.01)

(52) U.S. Cl.
CPC ............ *H04L 41/082* (2013.01); *G06F 8/65* (2013.01); *H04L 67/12* (2013.01); *H04L 67/34* (2013.01)

(58) Field of Classification Search
None
See application file for complete search history.

(56) References Cited

U.S. PATENT DOCUMENTS

| 7,542,998 B1 * | 6/2009 | Lavie .................... G06F 16/217 707/999.102 |
| 10,083,026 B1 * | 9/2018 | Venkata ................ H04L 41/082 |
| 10,541,886 B2 | 1/2020 | Bathen et al. |
| 10,841,164 B2 | 11/2020 | Kampanakis et al. |
| 11,550,597 B2 * | 1/2023 | Wilczek ................ G06N 20/00 |

(Continued)

FOREIGN PATENT DOCUMENTS

| EP | 3582439 A1 | 12/2019 |
| EP | 3582439 B1 | 10/2021 |
| WO | WO-2019033116 A1 | 2/2019 |

OTHER PUBLICATIONS

Combined Search and Examination Report under Sections 17 and 18(3) for Great Britain Application No. 2206277.2, mailed on Oct. 13, 2022, 8 pages.

(Continued)

*Primary Examiner* — Joshua Joo
(74) *Attorney, Agent, or Firm* — Pranger Law PC

(57) ABSTRACT

A method of managing a network of connected network devices can include detecting that a device descriptor file for a first network device has been updated and stored to a data store managed by a peer-to-peer network of computing systems; analyzing the updated device descriptor file stored to the data store; analyzing historical information stored in the data store regarding other device descriptor file updates related to the first network device or related to other network devices; performing predictive analytics processing on the results of the analyzing and generating a result; and storing the result of the performing predictive analytics processing to the data store.

11 Claims, 2 Drawing Sheets

(56) References Cited

U.S. PATENT DOCUMENTS

| | | | |
|---|---|---|---|
| 2004/0073659 A1* | 4/2004 | Rajsic | H04L 41/0893 |
| | | | 709/224 |
| 2019/0253319 A1 | 8/2019 | Kampanakis et al. | |
| 2019/0288913 A1 | 9/2019 | Salgueiro et al. | |
| 2019/0306023 A1* | 10/2019 | Vasseur | G06N 20/20 |
| 2019/0319953 A1 | 10/2019 | Lear et al. | |
| 2021/0350213 A1* | 11/2021 | Sethi | G06N 3/063 |
| 2022/0014444 A1* | 1/2022 | Ramanathan | G06N 3/08 |
| 2022/0247630 A1* | 8/2022 | Engi | H04L 41/0627 |
| 2022/0264425 A1* | 8/2022 | Epstein | H04B 7/0617 |
| 2022/0329488 A1* | 10/2022 | Engi | G06N 20/00 |
| 2022/0405750 A1* | 12/2022 | Fallah | H04L 9/14 |
| 2022/0417039 A1* | 12/2022 | Pan | H04L 9/3268 |
| 2023/0164029 A1* | 5/2023 | Mermoud | H04L 41/145 |
| | | | 709/220 |
| 2023/0216737 A1* | 7/2023 | Borsos | H04L 41/0813 |
| | | | 709/221 |

OTHER PUBLICATIONS

Extended European Search Report for Application No. 22170757.3, mailed on Aug. 31, 2022, 7 pages.

Kolokotronis N., et al., "Blockchain Technologies for Enhanced Security and Privacy in the Internet of Things," IEEE Consumer Electronics Magazine, Mar. 2019, vol. 8, No. 3, 6 pages.

Krishnan P., et al., "Software-Defined Security-by-Contract for Blockchain-Enabled MUD-Aware Industrial IoT Edge Networks," IEEE Transactions on Industrial Informatics, [Published: Jun. 2, 2021], vol. 18, No. 10, Oct. 2022, 20 pages.

* cited by examiner

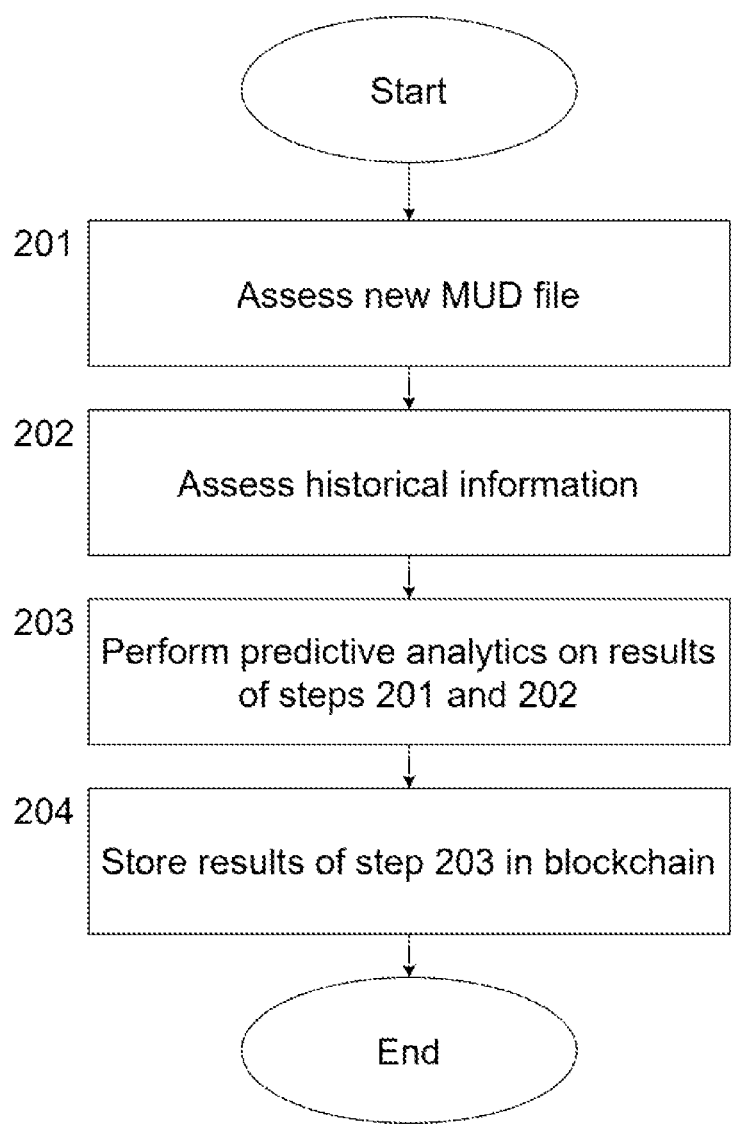

DEVICE DESCRIPTOR FILE MANAGEMENT WITH PREDICTIVE CAPABILITY

PRIORITY CLAIM

The present application claims priority from EP Patent Application No. 22170757.3, filed Apr. 29, 2022, which is hereby fully incorporated herein by reference.

TECHNICAL FIELD

This disclosure relates to the field of network management, where devices, such as IoT (Internet of Things) devices, are managed, so that such devices operate in an expected way in the context of an overall network of connected devices.

BACKGROUND

When IoT devices, and other network connected devices, are connected to form a network, a device descriptor file, such as a Manufacturer Usage Description (MUD) file, is used to describe how the IoT device should behave when it is connected into the network. For example, the MUD file can specify that a particular type of IoT device should connect to a specific cloud service using a specific network protocol and using a specific port. Typically, the manufacturer of the IoT device provides the MUD file and installs it in the IoT device or provides a link such as a URL so that the IoT device can obtain the MUD file over a network, such as from a file server. The MUD file could also be provided by an application provider who provides an application for running on the IoT device, or by a service provider who provides a service (such as a cloud backup service) with respect to the IoT device.

SUMMARY

A method of managing a network of connected network devices comprising: detecting that a device descriptor file for a first network device has been updated and stored to a data store managed by a peer-to-peer network of computing systems; analyzing the updated device descriptor file stored to the data store; analyzing historical information stored in the data store regarding other device descriptor file updates related to the first network device or related to other network devices; performing predictive analytics processing on the results of the analyzing and generating a result; and storing the result of the predictive analytics processing to the data store.

In some embodiments, the first network device is an IoT device.

In some embodiments, the method is performed by a first software defined network controller.

In some embodiments, performance of the predictive analytics predicts an impact of the updated device descriptor file on the network of connected devices.

In some embodiments, performance of the predictive analytics uses the predicted impact of the updated device descriptor file on the network of connected devices to determine a configuration update to the network of connected devices.

In some embodiments, the method further includes implementing the configuration update to the network of connected devices.

In some embodiments, the implementing of the configuration update to the network of connected devices alters the flow of data through the network of connected devices.

In some embodiments, performance of the predictive analytics includes using a machine learning decision tree algorithm to analyze a plurality of potential results based on the analyzing and to select one of the plurality of potential results.

In some embodiments, the device descriptor file has been updated by a manufacturer of the first network device.

In some embodiments, the device descriptor file has been updated by an application provider that provides an application for running on the first network device.

In some embodiments, the device descriptor file has been updated by a service provider that provides a service with respect to the first network device.

In some embodiments, a second software defined network controller analyses an impact on the network of connected network devices of the result of performing predictive analytics stored on a blockchain network, once said result has been applied to the network of connected network devices as a configuration update to the network of connected network devices.

In some embodiments, the updated device descriptor file is stored to a blockchain network after the updated device descriptor file has been approved by a plurality of parties who perform services related to the first network device.

In some embodiments, the device descriptor file is a manufacturer usage description (MUD) file.

In some embodiments, the data store managed by a peer-to-peer network of computing systems is a blockchain system.

A system and computer programs are also provided.

BRIEF DESCRIPTION OF THE DRAWINGS

Examples of methods, systems and computer programs are described below and represented schematically in the drawings of this specification, wherein:

FIG. 2 is a flowchart showing operations carried out with respect to the block diagram of FIG. 1.

DETAILED DESCRIPTION

Figure 1:
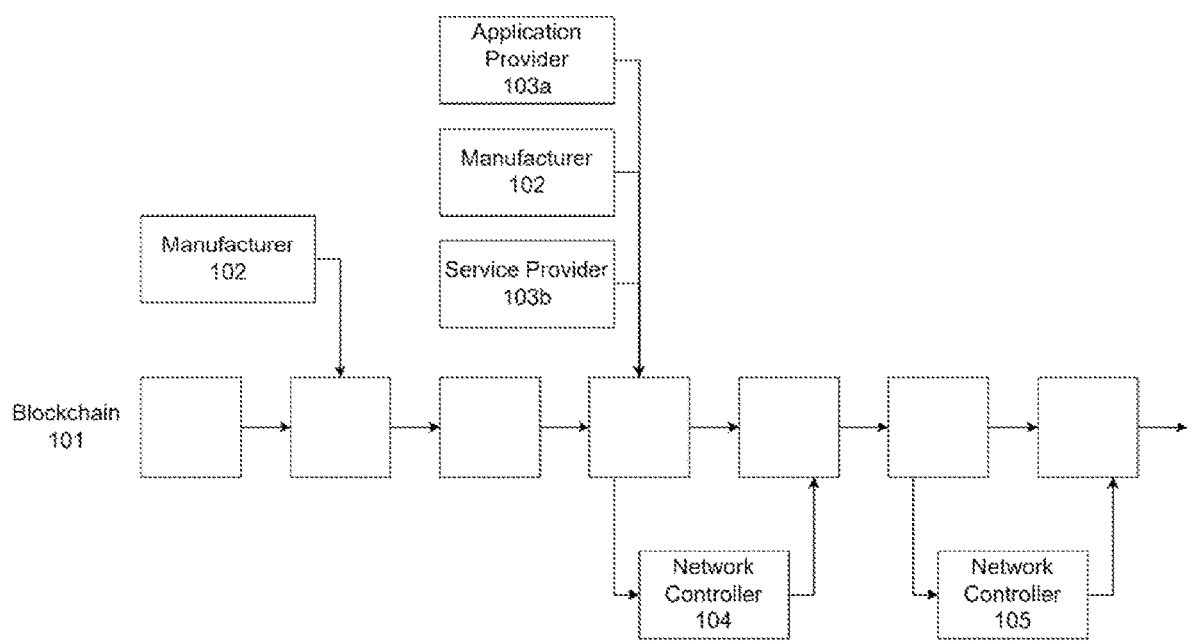
FIG. 1 is a block diagram showing a blockchain for storing MUD files and other information related to the management of a network of connected devices.

As shown in FIG. 1, according to the technology described in the present disclosure, a blockchain 101 is provided for storing MUD files and also for storing other information (as will be described below) related to the management of a network of connected devices (such as a plurality of IoT devices, such as sensors, routers or other network infrastructure).

One reason why MUD files are stored on a blockchain is that this enables the MUD files to be found easily. Even though MUD files can be identified by a URL, the URLs may not be up to date, for example, they may point to a lost or missing MUD file. Accordingly, devices may not be aware of the location of their MUD file. Also, for example, a MUD file may specify the domains the device is expected to communicate with, and if a domain name changes, e.g., a company name changes, the update server may be inaccessible.

Another reason for storing MUD files on a blockchain is that, otherwise, there is no built-in mechanism for managing MUD files, and the blockchain provides for a secure base in which network management of MUD files can be carried out. Management of MUD files is very important because if the device configuration (e.g., firmware) changes, such that the MUD file is not up to date, the device may not function.

The blockchain helps to solve the problem of MUD files being static (once created by the manufacturer they will stay for the lifetime of the device). A new updated MUD file is generated but the old one doesn't change. Accordingly, it is important that the latest MUD file is taken into account, and using a blockchain to store MUD files helps to make that happen.

The blockchain provides a central point where MUD files can be tracked and updated over the lifetime of the device. The blockchain is used to first validate any changes on the application/firmware/service/protocol, etc., where multiple vendors (e.g., a device manufacturer, an application provider or a service provider) verify an application to be applied or a firmware update or patch to be deployed or service to be added. In one scenario, the IoT device updates its MUD file with the verified application/firmware/services, etc., from the blockchain only if the MUD file update has been verified onto the blockchain by the multiple parties/vendors.

The MUD file changes can be added as a hierarchical tree on the blockchain, where, for example, the tree has a branch for Application, Firmware, Protocol, etc., that can be easily tracked to define exactly what is deployed.

At the far-left side of FIG. 1, a manufacturer 102 of an IoT device, for example, adds a new MUD file to the blockchain 101. The new MUD file is based on the IoT device's default behavior that the manufacturer 102 intends for the IoT device. The blockchain 101 is used to keep a secure record of each MUD file as it is issued by a manufacturer (or another party), for each device on the network of connected devices. The MUD file may need to be approved by other concerned parties (for example, using a known multi-sig transaction) before the new MUD file can be added/provisioned to the blockchain 101. For example, an application provider 103a (a party who provides an application for running on the IoT device) and/or a service provider 103b (a party who provides a service, such as a cloud backup service, with respect to the IoT device). In this latter case, it may be beneficial to allow the parties 103a/103b to have a say regarding whether the MUD file becomes provisioned, as the parties may not be able to, or may find it too difficult to, adapt their applications or services to the new behavior of the IoT device.

Moving to the right in FIG. 1, a network controller 104 is shown receiving input from a block on the blockchain (normally, the network controller 104 receives inputs from a plurality of blocks on the blockchain). The network controller 104 may be a software defined network (SDN) controller or agent, which is an application in a software-defined networking architecture that manages flow control for improved network management and application performance. As is well known, the SDN controller platform typically runs on a server and uses protocols to inform switches of where to send packets. SDN controllers direct traffic according to forwarding policies that a network operator puts in place, and this results in minimizing manual configurations for individual network devices. Accordingly, the network controller 104 is able to change how the network behaves, such as how traffic is prioritized, how the topology is shaped, etc. The network controller can be programmed using an API to modify the custom firmware to accomplish this, or an agent could be running alongside as part of, the network controller, to automate the processes inside of the network controller.

The network controller 104 receives an input from a block on the blockchain 101 which contains a MUD file which has been updated and analyses the MUD file in order to assess a potential impact on the network of connected devices which the network controller is controlling. For example, the MUD file may relate to a network router which the network controller is controlling, and the updated MUD file for that router may specify that a new web-based portal is added to the router signifying that traffic to port 80 needs to be enabled on the router. The network controller 104 may then compare this information to an enterprise determined security policy which may dictate that the router is an Internet facing router and therefore port 80 should not be opened on that router, so the network controller 104 sets up a firewall to prevent the new feature from coming into effect for the router. As shown in FIG. 1, the network controller 104 then writes new information to the blockchain 101 regarding the action that the network controller 104 took, in response to the new MUD file update. In the case of the example above, the network controller 104 adds a new block to the blockchain 101 with information explaining that in response to the MUD file update specifying that the specific router is to have a new web-based portal added, the network controller 104 has determined that a firewall should be set up to prevent the web-based portal new feature from coming into effect.

By adding this new information to the blockchain 101, the network controller 104 creates a historical record of past information related to how the network controller reacted to a MUD file update, given the specific circumstances (which may relate to the MUD file contents itself, or the state of the network of connected devices, or a particular policy that the network controller 104 is enforcing). This new information being added to the blockchain 101 is in addition to the MUD file updates themselves, which are also added to the blockchain 101 as explained above. Accordingly, because the blockchain 101 stores both the MUD files themselves and the information related to how a network controller, in the past, has reacted to a MUD file update, this block and the information in the blocks used by a network controller which is assessing a new MUD file update can now be accessed, and the network controller is able to learn from past experience of that network controller, or of another network controller, which has previously added a block to the blockchain 101 to explain what happened in response to a MUD file update in the past. Predictive analytics can be used to analyze the historical information stored on the blockchain, to inform the network controllers' response to a new MUD file update. And once the predictive analytics are used to inform a network controller's response to a new MUD file update, the network controller stores the information into a new block on the blockchain 101, thus creating additional information to support a future decision by this or another network controller. In this way, the information repository grows and becomes more and more useful in helping network controllers to, for example, reconfigure the network of connected devices that the network controller is managing, to better deal with a future new MUD file update.

As another example, a MUD file update for an IoT device could be related to security, such as where a particular software supplier, such as Microsoft, typically releases security patches on a Tuesday. This is a scenario known as "Patch Tuesday", where a surge of network traffic occurs on a Tuesday evening, as all machines in an office, for example, are updating to the new security patch at the same time. Accordingly, using the predictive analytics, the network controller 104 can compare this new MUD file update to historical data (from past Tuesdays where this has happened before, for example) and assess the impact on the network and determine what might need to be done to prepare for the change. For example, there could be 2,000 such network devices which would all be updating to the new security patch at the same time. The network controller 104 can take action by distributing the load using a plurality of known processes, such as changing the priority of traffic (traffic shaping), and the performance is evaluated by the network controller assessing the network latency (for example). The network controller could, for example, throttle all traffic to the manufacturer's update server for the next 12 hours and determine if the mean network latency changes, and if it does, the network controller could determine that not enough has been done, and a further action can be taken, but if the network latency does change, then the network controller could determine that this throttling action is a good way to address the problem and this should be used in the future to address the same or a similar situation when a future new MUD file update is received. As another example, a network controller may decide, in this situation, to implement a strategy where updates are provisioned to 10 devices at a time over a 36-hour period. This learned information is then written into the blockchain 101 by the network controller 104, to pass on this lesson learned to other network controllers to take advantage of (using their predictive analytics capabilities).

Specifically, Windows Update uses the Background Intelligent Transfer Service (BITS) to download updates, using idle network bandwidth. However, BITS will use the speed as reported by the network interface (NIC) to calculate bandwidth. This can lead to bandwidth calculation errors, for example, when a fast network adapter (e.g., 10 Mbits/s) is connected to the network via a slow link (e.g., 56 kbit/s).

Furthermore, the Windows Update servers of Microsoft do not honor the TCP's slow-start congestion control strategy. As a result, other users on the same network may experience significantly slower connections from machines actively receiving updates. This can be particularly noticeable in environments where many machines individually retrieve updates over a shared, bandwidth-constrained link such as those found in many multi-PC homes and small to medium-sized businesses. Bandwidth demands of patching large numbers of computers can be reduced significantly by deploying Windows Server Update Services (WSUS) to distribute the updates locally.

In addition to updates being downloaded from Microsoft servers, Windows 10 devices can "share" updates in a peer-to-peer fashion with other Windows 10 devices on the local network, or even with Windows 10 devices on the Internet. This can potentially distribute updates faster while reducing usage for networks with a metered connection. Accordingly, the predictive capability described above can be very useful in such a scenario where a MUD file update involves a Microsoft Windows security patch.

As shown in FIG. 2, the network controller, therefore, may assess (at 201) the new MUD file on the blockchain (or to be added to the blockchain) and also may assess historical information contained on the blockchain (at 202), and may use predictive analytics on the result of these analyses to determine (at 203) an appropriate response to the new MUD file, and then stores (at 204) information related to the response to the blockchain.

The network controller 104 can determine mitigations which could be carried out, to mitigate a potentially negative effect of implementing the new MUD file update, such as was explained above in the example where a firewall was added. Even if no action were taken, but a negative effect was experienced, this negative effect itself can be added to the blockchain for informing future situations of what has happened. For example, a network controller could add a warning to the blockchain saying that the network controller attempted to patch 2,000 devices in response to a MUD file update and the network crashed. Also, as part of an evaluation, a network controller can log a change in mean network latency when an update was provisioned (for example, a network controller could add a statement to the blockchain that an update was provisioned and a significant change in network latency was experienced).

Examples of events that might be predicted (changes to behavior) at the network layer are increased/changing network load, and changing requirements for routing.

Examples of events that might be predicted (changes to device behavior) are the addition/removal of services from the device, or application behavior with respect to the device (e.g., which sensors are on or off).

Examples of actions that could be taken at the network layer are:
  1) Traffic shaping
  2) Restrict updates to out of hours
  3) Firewall reconfiguration—ports, routing
  4) DNS (Domain Name Server) entries, trusted domains, PKI (public key infrastructure) configuration.

As an example, if the MUD file update specifies a new cloud storage provider, the predictive capability could determine that an interim period exists where the old and new configurations are relevant, load balancing may be introduced, and firewalls may be reconfigured.

More than one network controller could be used. As shown in FIG. 1, a second network controller 105, for example, could monitor the impact of the action taken by the first network controller 104 on the network of connected devices, and, like the first network controller, can use performance evaluation criteria such as mean network latency to monitor progress of how the updates are affecting the network of connected devices. This could be following multiple updates or just observations over time (for example, the update was installed last month and at present, the network performance is at this level, and two months later, the network performance is at this different level).

As another example of the events that the predictive analytics could predict, a MUD file could define the host names that a device is expected to connect to. Then, if a manufacturer decides to add a cloud based back up service for the device to use, the host name would change such that the MUD file would now have a new host name pointing to the new cloud based back up service. The network controller can predict that there will be increased load on the network because of the new cloud-based backup service, particularly in a scenario where there are 2,000 such devices (that the MUD file pertains to) deployed on the network, and each such device will experience a change in its behavior that will have an impact on how the device performs.

The predictive analytics can also take into account the MUD files of other similar devices, and the previous actions that network controllers have taken for the other similar devices, where those similar devices are expected to/predicted to be relevant to the device where a MUD file has just been updated. That is, the predictive analytics are not limited to looking at information on MUD files for the same exact device that is currently the subject of a new MUD file update.

Regarding the specifics of how the predictive analytics could function, a machine learning based decision tree approach could be used, where the historical MUD change data is used as a training set. Specifically, the network controller can assess the parameters in the relevant blocks on the blockchain 101 and can analyze all the different choices that could be made regarding the appropriate response to a MUD file update, concerning addressing different changes in behavior. A selection is then made of one of the choices that optimizes a likely outcome. For example, historical data is examined regarding where a MUD file has specified new ports to be opened, and the potential outcomes of the opening of the new ports is assessed against evaluation criteria as to what is considered a good outcome in this scenario.

As two examples, one could use either a mean latency approach or an approach with respect to SYN/ACK to determine how many times a connection is likely to fail. In the first example, SYN/ACK relates to a synchronize and acknowledge packet approach, where one would expect a one-to-one relationship between the SYN packets and the ACK packets. If it is determined that there are more SYN packets than ACK packets there is potentially a loss in communication and potentially services would be going down. Similarly, in the second example, in a network latency approach it is assessed to what extent traffic slows down on the network, and different criteria can be set depending on the result being attempted to be achieved, that is, the target result, for example, what the network is trying to avert. The performance criteria are then committed to the blockchain 101 by the network controller 104, so network controllers, going forwards, can have information regarding what has worked and what has not.

It is likely to be the case that the blockchain 101 is not a public blockchain accessible by anyone, but rather, a private blockchain (permissioned) used only by a small community of users such as telecommunications companies, or a small network of enterprises, that have a certain level of trust in each other. This avoids the need, for example, for a network controller's updates to the blockchain having to be agreed in a consensus arrangement, by other parties on the blockchain, as is typically required for a public blockchain, and also reduces the likelihood that an outside party will be able to add false information to the blockchain to negatively affect the way the network is managed.

One approach that could be used to implement the technology described above, is that a plurality of network controllers could be deployed, with each one trying a different action on a different segment of the network, and one network controller may see an increase in latency while another network controller might see no increase in latency. This information can be stored to the blockchain by each network controller so that when a new MUD file update is received, the update could be recognized as very similar to a historic one from these many different records, across different segments of the network, so this can helpfully inform the decision-making process.

As a final example of the usefulness of the disclosed technology, a MUD file update may specify that an IoT device now will be streaming music as a new application to be added to the applications run on the device. This results in extra traffic, and the network controller learns, by assessing historical information stored in blocks on the blockchain, that this increased traffic for dealing specifically with music files, has been dealt with in a specific way by a different IoT device which was in a specific network configuration, and the present IoT device has a similar network configuration, and therefore, a specific problem is identified as likely and a solution/mitigation is found by referring to the appropriate historical block on the blockchain. The network controller thus knows how to predict the solution to the problem (as well as the problem itself) using predictive analytics and can, for example, reconfigure the network accordingly.

While MUD files have been described above, other types of device descriptor files could be used.

While a blockchain network has been described above, other systems could also be used as the peer-to-peer network of computing systems that manages the data store.

The invention claimed is:

1. A method of managing a network of connected network devices comprising:
    detecting that a device descriptor file for a first network device has been updated and stored in a data store managed by a peer-to-peer network of computing systems;
    analyzing the updated device descriptor file stored in the data store;
    analyzing historical information stored in the data store regarding other device descriptor file updates related to the first network device or related to other network devices;
    performing predictive analytics processing on results of the analyzing of the updated device descriptor file and the analyzing of the historical information and generating a result, wherein performing the predictive analytics processing includes using a machine learning decision tree algorithm to analyze a plurality of potential results based on the analyzing of the updated descriptor file and the analyzing of the historical information and to select one of the plurality of potential results, and wherein performing the predictive analytics processing predicts an impact of the updated device descriptor file on the network of connected network devices and uses the predicted impact of the updated device descriptor file on the network of connected network devices to determine a configuration update to the network of connected network devices;
    storing the result of the predictive analytics processing in the data store; and
    implementing the configuration update to the network of connected network devices.

2. The method of claim 1, wherein the first network device is an IoT device.

3. The method of claim 1, wherein the method is performed by a first software defined network controller.

4. The method of claim 1, wherein the implementing of the configuration update to the network of connected network devices alters a flow of data through the network of connected network devices.

5. The method of claim 1, wherein the detecting follows updating of the device descriptor file by one of: a manufacturer of the first network device; an application provider that provides an application for running on the first network device; or a service provider that provides a service with respect to the first network device.

6. The method of claim 3, wherein a second software defined network controller analyzes an impact on the network of connected network devices of the result of the performing predictive analytics stored on a blockchain network, once the result has been applied to the network of connected network devices as a configuration update to the network of connected network devices.

7. The method of claim 1, wherein the updated device descriptor file is stored in a blockchain network after the updated device descriptor file has been approved by a plurality of parties that perform services related to the first network device.

8. The method of claim 1, wherein the device descriptor file is a manufacturer usage description (MUD) file.

9. The method of claim 1, wherein the data store managed by the peer-to-peer network of computing systems is a blockchain system.

10. A system comprising:
   at least one processor and memory configured to manage a network of connected network devices by:
      detecting that a device descriptor file for a first network device has been updated and stored in a data store managed by a peer-to-peer network of computing systems,
      analyzing the updated device descriptor file stored in the data store,
      analyzing historical information stored in the data store regarding other device descriptor file updates related to the first network device or related to other network devices,
      performing predictive analytics processing on results of the analyzing of the updated device descriptor file and the analyzing of the historical information and generating a result, wherein the performing predictive analytics processing includes using a machine learning decision tree algorithm to analyze a plurality of potential results based on the analyzing of the updated descriptor file and the analyzing of the historical information and to select one of the plurality of potential results, and wherein performing the predictive analytics processing predicts an impact of the updated device descriptor file on the network of connected network devices and uses the predicted impact of the updated device descriptor file on the network of connected network devices to determine a configuration update to the network of connected network devices,
      storing the result of the predictive analytics processing in the data store, and
      implementing the configuration update to the network of connected network devices.

11. A non-transitory computer-readable storage medium storing a computer program comprising instructions which, when executed by a computer system, cause the computer system to manage a network of connected network devices by:
   detecting that a device descriptor file for a first network device has been updated and stored in a data store managed by a peer-to-peer network of computing systems;
   analyzing the updated device descriptor file stored in the data store;
   analyzing historical information stored in the data store regarding other device descriptor file updates related to the first network device or related to other network devices;
   performing predictive analytics processing on results of the analyzing of the updated device descriptor file and the analyzing of the historical information and generating a result, wherein performing the predictive analytics processing includes using a machine learning decision tree algorithm to analyze a plurality of potential results based on the analyzing of the updated descriptor file and the analyzing of the historical information and to select one of the plurality of potential results, and wherein performing the predictive analytics processing predicts an impact of the updated device descriptor file on the network of connected network devices and uses the predicted impact of the updated device descriptor file on the network of connected network devices to determine a configuration update to the network of connected network devices;
   storing the result of the predictive analytics processing in the data store; and
   implementing the configuration update to the network of connected network devices.

\* \* \* \* \*